April 14, 1970 J. J. KLINIKOWSKI 3,506,816

ELECTRONIC DECODER CIRCUIT

Filed July 1, 1965

INVENTOR
J. J. KLINIKOWSKI
BY Robert A. Green
ATTORNEY

United States Patent Office 3,506,816
Patented Apr. 14, 1970

3,506,816

ELECTRONIC DECODER CIRCUIT

James J. Klinikowski, Somerville, N.J., assignor to Burroughs Corporation, Detroit, Mich., a corporation of Michigan Filed July 1, 1965, Ser. No. 468,891
Int. Cl. H03k 13/00; G06f 5/02
U.S. Cl. 235—155 1 Claim

ABSTRACT OF THE DISCLOSURE

A decoder circuit comprising a decimal display tube of the type adapted to provide visual display of numerals "0" to "9" and ten four-electrode semiconductor switching devices arranged in five pairs so that there are two groups, each including five of the devices. In addition, two auxiliary control switching devices of the same type are coupled, one to each group of five switching devices. Each control device is connected so that it can disable its group of five switching devices, whereby the other group of five is enabled. The ten switching devices and the two control devices are connected to the output of a decoder which provides output signals in biquinary form decoded from binary-coded decimal code. The applied signals operate one of the control devices and one member of the enabled group of five devices, whereby a single cathode numeral in the display tube is energized. Low level input signals may be used to operate the various switching and control devices because of the manner in which the control devices are connected to the groups of switching devices.

My invention relates to electronic decoder circuits and, particularly, to decoder circuits which use biquinary logic.

In my copending applications Ser. Nos. 353,845, now Patent No. 3,309,695, and 353,846, now Patent No. 3,304,548, filed Mar. 23, 1964, and assigned to the assignee of this application, I described a number of data processing systems in which binary-coded decimal information is decoded to decimal information with an intermediate step in which the decimal information is in the form of biquinary logic. These systems generally include a source of binary-coded decimal information which is fed on eight lines into a decoder matrix from which seven output lines run, five of which are signal lines and carry decimal signals, and two of which carry control signals. At this stage, the information is in biquinary form, and it is applied to ten signal-registering devices which are interconnected to provide a single output signal which is the desired information in decimal form. It is customary and desirable to display this information in a decimal display device such as a cold cathode indicator tube. One tube of this type manufactured and sold by Burroughs Corporation under the trademark Nixie is an indicator tube which includes ten cathode glow electrodes in the form of the numerals zero through nine and an anode electrode with which the cathodes operate.

In the above-described circuit, the ten signal-registering devices are arranged in pairs so that two groups of five switching devices are provided. In each pair of register devices, each device is connected to and operates one cathode numeral in the decimal display tube. Each of the decimal signal lines is connected to a pair of register devices, and each control line is connected to one group of five register devices. When a decimal signal is applied on one of the decimal signal lines to a pair of register devices and, in effect, to a pair of cathodes, the one proper register device and the one proper cathode is selected and caused to glow by the application of a suitable selecting potential through the control line to a group of five register devices which are disabled. At the same time, the other group of five register devices are placed in condition to register information, and the one device in this group, which has received the decimal information signal, performs the registration operation and causes the correct decimal cathode numeral to glow.

Decoder circuits of the type described have employed triode transistors as signal-registering devices, and, more recently, four electrode semiconductor devices known as silicon controlled switches (SCS devices) have been employed. SCS devices include four electrodes, an anode, an anode gate, a cathode, and a cathode gate. In operation of these circuits using SCS devices, the circuit arrangement has been such that relatively large input signal levels, of the order of six to ten volts, have been required to achieve proper operation. In decoder circuits using SCS devices, there is a need for circuits which will operate with low input signal levels, of the order of one to two volts, and the objects of the present invention are directed to the provision of an improved electronic circuit using SCS devices which are arranged to be operated by input signals of minimum amplitude.

The objects of the invention also relate to the provision of an improved signal decoder circuit, particularly, a biquinary logic circuit which is operable with minimum voltage levels.

Briefly, a decoder circuit embodying the invention includes a decimal display tube of the type described above and ten SCS semiconductor signal-registering devices which are arranged in five pairs so that there are two groups of five register devices each. In the circuit, information signals which are received are applied to the pairs of register devices. In addition, two register devices of the same type, operable as control devices, are coupled one to each group of five register devices. Each control device serves to disable one group of five register devices whereby the other group of five is enabled and one of the latter five, which is in the pair which receives an information signal, can perform the registering operation. According to the invention, the input information signals, which energize a pair of register devices and a pair of cathode numerals, and the control signals, which disable one register device and enable one device of a pair, are so applied in the circuit that only a minimal input signal level is required to operate the register devices.

The invention is described in greater detail with reference to the drawing wherein.

Figures 1, 2, 3:
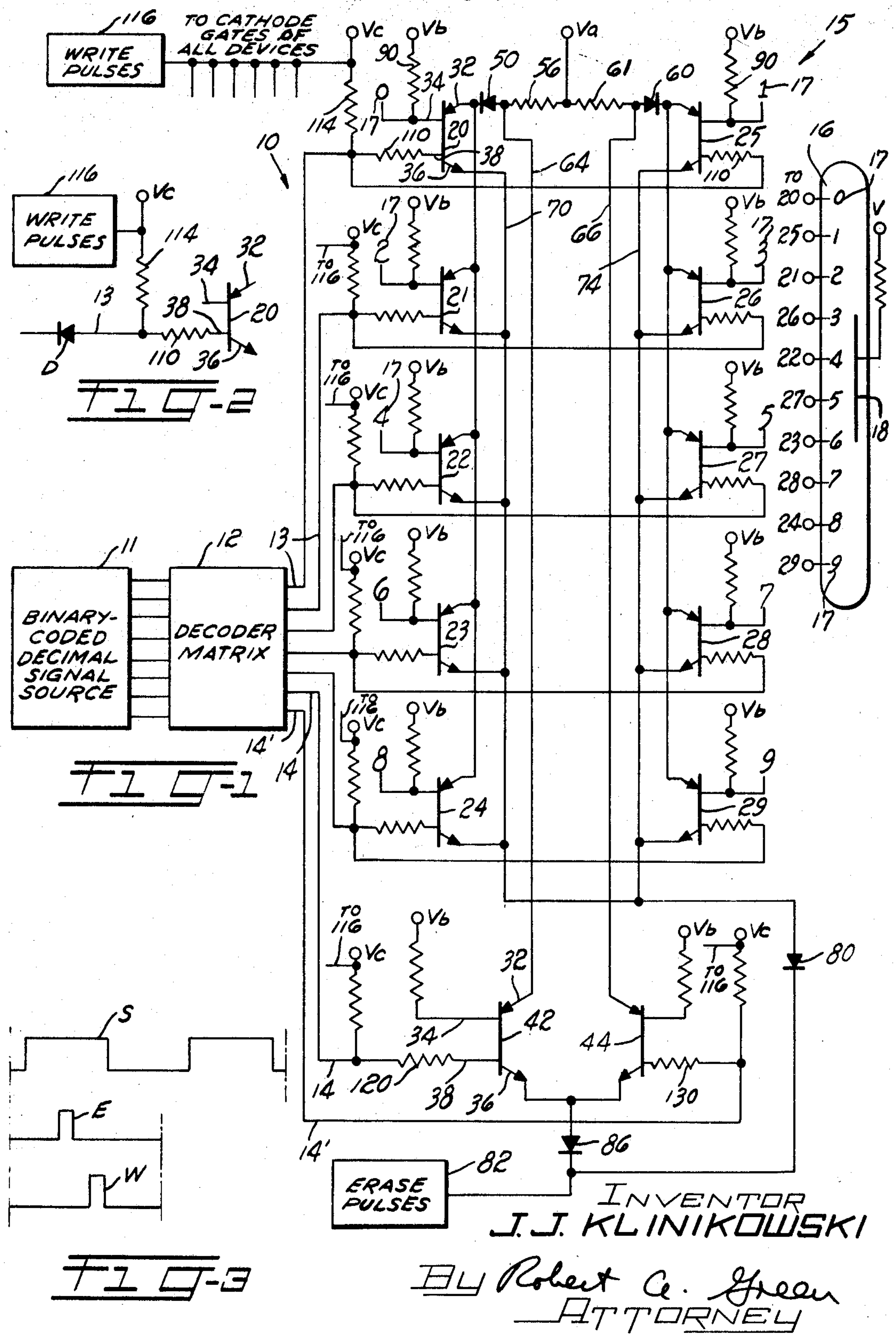
FIG. 1 shows a decoder system embodying the invention.
FIG. 2 shows a portion of the system of FIG. 1.
FIG. 3 shows the time relationship between three voltages used in the invention.

A decoder system 10 which utilizes the circuit of the invention includes a source 11 of binary-coded decimal signals which are fed on eight lines into a decoder matrix 12 of diodes or the like. The decoded decimal signal bits appear at the output of the decoder on seven lines, five lines 13 comprising signal information lines, and two lines 14, 14' comprising signal control lines. Thus, the output of the matrix comprises decimal information which is in biquinary logic form. This decimal information is fed into the biquinary logic circuit portion 15 which embodies the invention, and the output of the circuit 15 is a signal having a decimal meaning which is displayed in indicator tube 16 which is of the type described above. The indicator or display tube 16 includes ten glow cathodes 17 in the form of numerals zero to nine and an anode electrode 18. As is well known, when a positive potential of about 150 volts is applied between anode 18 and a cathode numeral 17, the cathode exhibits cathode glow.

The biquinary logic circuit portion 15 includes ten signal-receiving and registering elements 20 to 29, each of which is a four-electrode semiconductor device known as a silicon controlled switch or SCS device. Each SCS device includes an anode electrode 32, an anode gate electrode 34, a cathode electrode 36, and a cathode gate electrode 38. As shown, the SCS devices 20 to 29 are arranged in a biquinary pattern, that is, in two groups of five and in pairs, with one member of a pair being in each group. Thus, one group includes devices 20 to 24, and the other group includes devices 25 to 29, with the pairs being 20–25, 21–26, 22–27, 23–28, 24–29. In addition, two auxiliary SCS devices 42 and 44 are provided to control the operation of the two groups of five devices. The auxiliary control devices 42 and 44 also include the same electrodes, similarly numbered, as the devices 20 to 29.

In the circuit 15, the five devices 20 to 24 have their anode electrodes 32 connected together through a bias diode 50 oriented as shown and a suitable resistor 56 to a positive D.C. anode voltage supply V*a*. The anodes 32 of the other group of SCS devices 25 to 29 are similarly connected through a bias diode 60 and resistor 61 to the bias supply V*a*. The junction of the resistor 56 and bias diode 50 is coupled through a lead 64 to the anode 32 of the control device 42, and the junction of the resistor 61 and bias diode 60 is connected through a lead 66 to the anode of the control device 44. The cathode of each device 20 to 24 of the first group is connected to a bus 70, and the cathode electrodes of the five devices in the second group are similarly connected to a bus 74, and the two buses 70 and 74 are connected together through a diode 80 to a source 82 of positive erase pulses. The source 82 of erase pulses is also coupled through a diode 86 to the cathode electrodes 36 of the two control devices 42 and 44.

The anode gate 34 of each SCS device 20 to 29 is coupled through a suitable resistive path 90 to a source of bias voltage V*b* and to a cathode indicator electrode 17 in indicator tube 15. As illustrated in the aforementioned applications and as is well known, each input code determines the particular cathode numeral to which each register device 20 to 29 must be connected. For purposes of illustration, it is assumed that each pair of SCS devices is connected to successive cathode electrodes, for example, device 20 is connected to cathode numeral "0", and its mate 25 is connected to cathode numeral "1"; device 21 is connected to numeral "2," and its mate is connected to numeral "3," etc.

In each pair of SCS devices, the cathode gate electrodes 38 are coupled through isolating resistors 110 and a common resistive path 114 to a source of positive D.C. bias voltage V*c* and to a source of positive write pulses 116. Pulse source 116 is common to SCS devices 20 to 29 Each pair of cathode gate electrodes is also connected to one of five output signal lines 13 from decoder matrix 12. In a typical diode decoder, each output line 13 is coupled to at least one diode in the matrix (not shown), and generally, the presence or absence of a signal bit on a line 13 either forward-biases or reverse-biases the diode to which the line is coupled. Thus, the diode can act as a gate, depending on other signals to be described below. Two types of diode matrix decoders which operate in this way are the BIP 5608 and BIP 5609 made and sold by Burroughs Corporation.

Referring to the control devices 42 and 44, the cathode gate 38 of device 42 is coupled through a resistive path 120 both to power supply V*c* and to pulse source 116 and to one of the control signal lines 14 from the decoder matrix 12. Similarly, the cathode gate 38 of device 44 is coupled through a resistive path 130 both to supply V*c* and to pulse source 116 and to the other control signal line 14′ from the decoder matrix.

Operation of the SCS devices 20 to 29 and 42 and 44 is described briefly with reference to FIG. 2 which shows SCS device 20, and some of its associated circuitry. In one mode of operation of the SCS devices in the circuit 10, V*a*, V*b*, V*c*, erase pulses from source 82, write pulses from source 116, and information pulses are all about 12 volts. In order to turn on SCS device 20, current must flow from V*c* through resistors 114 and 110 and from the cathode gate 38 into the cathode 36 and its associated circuit. In FIG. 2, diode D represents a diode in decoder 12 to which line 13 is connected. In the system described and illustrated, when a group of binary-coded decimal signals is fed into decoder 12 and is decoded, a positive signal is applied to one diode D and its output line 13 and negative signals are applied to the other four diodes D and their lines 13. Similarly, one of the lines 14 and its diode D carries a positive signal, and the other carries a negative signal.

Referring again to FIG. 2, when a positive level signal is applied to diode D, oriented as shown, this, in effect blocks line 13 and biases the cathode gate circuit so that, when a write pulse is applied to the cathode gate by source 116, current flows from V*c* through the path including resistors 114 and 110 and through the cathode gate to the cathode circuit and turns on the SCS device 20. When a negative level information signal is applied from the decoder to diode D and its line 13 to device 20, with the various bias voltages applied, diode D is forward-biased and line 13 is open and represents the preferred current flow path. Thus, when a write pulse is applied, current is bypassed through resistor 114 and line 13 into the decoder matrix and device 20 cannot turn on.

The time relationship between the various signals applied in the circuit 10 is illustrated in FIG. 3. Signal information is represented by wave S which includes positive and negative signal levels. To perform a signal decoding and registering operation, first, an erase pulse E, of relatively short duration, is applied during the time period of the information signal, and then a write pulse W, of relatively short duration, is applied following the erase pulse and still during the time interval of the information signal.

Another feature of the operation of circuit 15 relates to the interaction between control devices 42 and 44 and information registering devices 20 to 29. The relationship is such that, when device 42 is on and conducting current from source V*a* through bus 64, devices 20 to 24 are held off and cannot turn on. Similarly, when device 44 is on and conducting current from source V*a* through bus 66, devices 25 to 29 are held off and cannot turn on.

Referring now to the operation of the entire system 10, generally, binary-coded decimal information appears continually at the input of the decoder matrix 12 and signals in biquinary code appear at the output of the decoder matrix 12. This information may be changing constantly. At any instant, signal voltages are present on the five signal lines 13 and on the two control lines 14, 14′. As a result of the decoding operation, only one of the signal lines 13 and one of the control lines 14, 14′ carries the proper signal to turn on an SCS device. Assuming that the signal lines 13 to devices 20 and 25 and line 14′ to control device 44 carry such a signal, a positive signal, then both devices 20 and 25 are able to turn on; however, when a write pulse is applied to all devices from source 116, control device 44 turns on and current flows through lead 66 and prevents all devices in the group including devices 25 to 29 from turning on. Thus, only device 20 can turn on and pass current from source V*b*. This causes a suitable negative potential to be applied to cathode numeral "0" in tube 16, and this cathode glows.

This condition can be maintained indefinitely since the SCS devices are storage devices. When it is desired to decode another combination of binary-coded decimal bits, a positive erase pulse is first applied by source 82 to anode gates of all of the SCS devices 20 to 29 and 42 and 44, and all devices which were on are turned off. When a write pulse is then applied and a new combination of signal bits is decoded, a new pair of SCS devices and the proper control device are energized. One SCS device is allowed to turn on and, as a result, the desired decoded decimal number is displayed in tube 16.

The circuit of the invention, as described above, has the primary advantage that operation of the register devices can be achieved by means of input signal levels as low as one to two volts. This contrasts with comparable circuits using the same types of register devices in which input levels of the order of six volts or more are required. This advantage is achieved because the control devices are coupled to the anode electrodes of devices 20 to 29 and the path from the cathode gate 38 of the SCS devices to the source 82 of erase pulses is relatively free of voltage-dropping devices such as SCS devices, transistors, or diodes. The sum of the voltage drops due to such devices when present determines the threshold voltage for turning on an SCS device. The greater this detection threshold, the wider must be the separation between positive and negative input levels.

What is claimed is:

1. A signal decoder circuit for converting binary-coded decimal signals to decimal signals including a plurality of semiconductor switching devices, each having anode, anode gate, cathode gate, and cathode electrodes, said devices being arrayed in first, second, third, fourth, and fifth pairs of decimal display devices, said display devices being connected in first and second groups, with one member of each pair being in said first group and the other member of each pair being in said second group, one of said semiconductor devices also being operated as a first control device coupled to said first group of display devices, another of said semiconductor devices being operated as a second control device coupled to said second group of display devices, a first bus connected to the cathode electrodes of each of said display devices in said first group, a second bus connected to the cathode electrodes of each of said display devices in said second group, a first voltage source connected through a first resistive path and a first diode to all of the anode electrodes of said devices in said first group, said first voltage source being connected through a second resistive path and a second diode to the anode electrodes of all of said devices in said second group, a third bus connected from the junction point of said first resistive path and said first diode to the anode electrode of said first control device, a fourth bus connected from the junction point of said second resistive path and said second diode to the anode electrode of said second control device, the cathode electrodes of said first and second control devices being connected through a third diode to a source of erase pulses which is connected through a fourth diode to said first and second buses and thus to the cathode electrodes of all of said display devices, a source of binary-coded decimal signals coupled to a decoding matrix having seven output lines, five of which are connected to the cathode gates of each said pair of display devices, the sixth and seventh lines being connected to the cathode gate electrode of said first and second control devices, respectively, each cathode gate electrode of all of said devices being connected to a second voltage source and to a source of write pulses, each anode gate of all of said devices being connected to a third voltage source and to a decimal display character, each combination of signal bits appearing on said seven output lines applying turn-on potential to said first control device, turn-off potential to said second control device, and enabling potential to one pair of said display devices, there being a current flow path and current flow from said first voltage source through said first resistive path and through said first control device whereby current cannot flow through any of said devices in said first group, there also being a current flow path and current flow from said first voltage source through said resistive path and said second diode and through the selected display device of said enabled pair of devices which is in said second group of devices, the turn-on of said selected display device being aided by current flow from said third voltage source to its cathode gate electrode, the turn-on of said selected display device taking place when a write pulse is applied to the cathode gate electrode of said selected device substantially simultaneously with the application of said signal bits to said seven lines.

References Cited

UNITED STATES PATENTS

| | | | |
|---|---|---|---|
| 2,982,880 | 5/1961 | Klipstein | 315—84.6 XR |
| 3,119,950 | 1/1964 | Somlyody | 315—84.6 |
| 3,222,503 | 12/1965 | Cerulli | 235—92 |
| 3,290,551 | 12/1966 | Cake | 315—84.6 |
| 3,395,268 | 7/1968 | Barton | 315—84.6 X |

OTHER REFERENCES

Stasior, R. A.: "Silicon Controlled Switches," 90.16—6/64 General Electric Application Note, "SCS Applications."

Ford, W. G.: I.B.M. Technical Disclosure Bulletin, Lost Impulse Detector, January 1965, vol. 7, No. 8, pp. 729–730.

MAYNARD R. WILBUR, Primary Examiner

M. K. WOLENSKY, Assistant Examiner

U.S. Cl. X.R.

307—305; 340—347